March 3, 1942.  J. R. SUTTHOFF  2,275,162
ROPE COUPLING, REVERSING, AND RE-FORMING MEANS
Filed Nov. 3, 1941

INVENTOR
John R. Sutthoff
BY
Fred. C. Matheny
ATTORNEY

Patented Mar. 3, 1942

2,275,162

UNITED STATES PATENT OFFICE 2,275,162

ROPE COUPLING, REVERSING, AND RE-FORMING MEANS

John R. Sutthoff, Sausalito, Calif.

Application November 3, 1941, Serial No. 417,649

4 Claims. (Cl. 294—78)

My invention relates to wire rope coupling, reversing and re-forming means and an object of my invention is to provide a simple and efficient means for coupling or connecting a wire rope to a clevis or like device in such a manner that the wire rope will be free to swivel and turn relative to the clevis, is quickly and easily reversed end for end relative to the clevis without detaching it from the clevis and is re-formed as respects deformations of cross sectional shape when it is reversed end for end.

Another object is to provide a wire rope coupling, reversing and re-forming means in which a wire rope is slidably disposed in a cylindrical die member of the correct diameter and shape so that, if said wire rope is deformed cross sectionally it will be re-formed and restored to a substantially round cross sectional shape when it is drawn through the die member in reversing said wire rope end for end.

Another object is to provide a wire rope coupling, reversing and re-forming means of strong and substantial construction that is capable of readily passing over rollers, drums, sheaves, fairleads and the like without damage to the rope or to the coupling means.

Another object is to provide a wire rope coupling, reversing and re-forming means of strong and substantial construction that will reduce wear on the strands of the rope and thereby conserve wire rope by increasing the useful life of the same.

Another object is to provide a wire rope coupling, reversing and re-forming means that is especially well adapted for use in connection with wire ropes commonly called "archlines" and used for hauling logs or like loads behind tractors that are equipped with winding drums or winches by which one end portion of the load being hauled may be raised clear of the ground and the other or trailing end allowed to drag on the ground.

Other objects are to provide wire rope coupling, reversing and re-forming means that makes possible the end for end reversal of a wire rope in a minimum length of time and with a minimum amount of labor and without alteration of the wire rope.

Other objects of the invention will be apparent from the following description taken in connection with the accompanying drawing.

In the drawing

Like reference numerals designate like parts throughout the several views.

Figure 1:
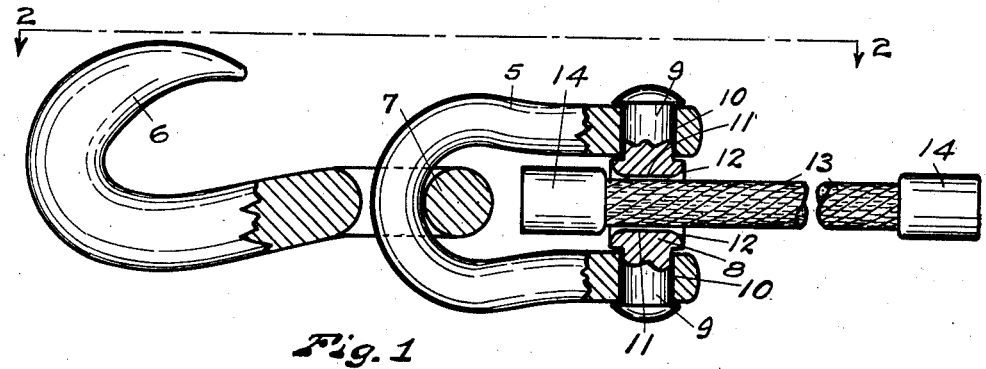
Figure 1 is a side elevation, with parts in section, of a wire rope coupling, reversing and re-forming means constructed in accordance with my invention.
Figure 2:
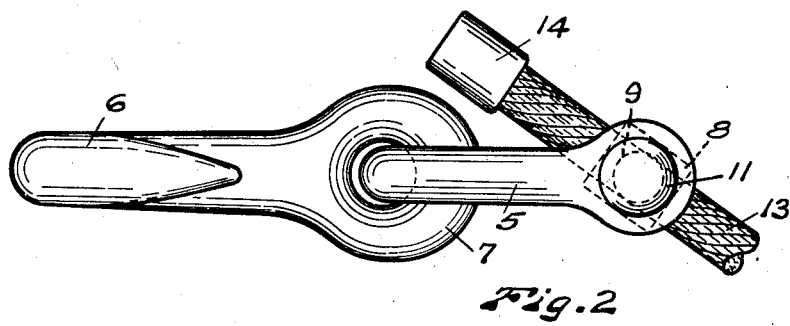
Fig. 2 is a plan view of the same looking in the direction of line 2—2 of Fig. 1, and with the yoke member and wire rope moved into an angular position different from the position they occupy in Fig. 1.

Referring to Figs. 1 and 2 of the drawing, 5 is a clevis of substantially U shape and 6 is a hook having an eye portion 7 at one end that is engaged with the clevis 5 to provide articulate connection between said hook and said clevis.

A combined die member and yoke is pivotally supported in the end portion of the clevis 5 furthest removed from the hook 6. This die member and yoke comprises a medial portions 8, preferably of square or rectangular cross section, having two aligned bearing pins 9 on opposite ends thereof that are journaled in aligned holes 10 in the spaced apart eye portions of the clevis 5. Preferably the end portions of the pins 9 are upset or peened to provide greater strength and prevent the two sides of the clevis from spreading apart.

The central portion 8 of the yoke is provided with a transverse die opening or hole 11 positioned at right angles to the axes of the pins 9 and substantially mid way between the two side members of the clevis 5. The end or mouth portions of the die opening 11 are relieved to provide rounded expanding surfaces 12 for a wire rope to draw over and against. These rounded end surfaces 12 prevent cutting of the strands of the wire rope and reduce the wear thereon. Preferably the die member or yoke 8 is of hardened steel.

The wire rope 13 has a ferrule 14 rigidly secured to each end portion thereof and one of these ferrules 14 is always drawn against the yoke 8 when the line 13 is under tension.

The ferrules 14 are tubular members of any desired external shape that are made fast to the wire rope by inserting the end portion of the rope into the ferrule, preferably bending the ends of the wire strands of the rope and pouring melted Babbitt metal into the ferrule. Such a ferrule is only a few inches long and hence, if the rope becomes worn near the ferrule, the rope can be cut off where it is worn and the ferrule re-set on the rope without shortening the wire rope more than a few inches.

Figure 3:
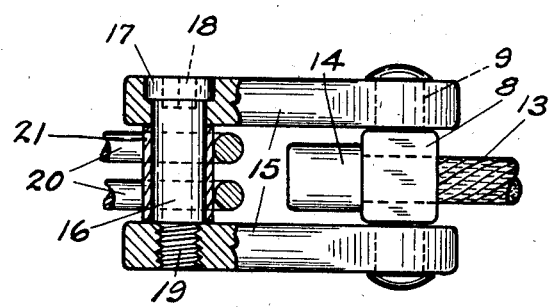
Fig. 3 is an elevation, with parts in section, showing my invention installed in connection with a type of clevis that is different from the clevis shown in Figs. 1 and 2.

In the form of my invention shown in Fig. 3, the yoke 8, wire rope 13 and ferrule 14 are the same as those shown in Figs. 1 and 2. The clevis shown in Fig. 3, is made up of two separate side links 15 pivotally connected at one end with the yoke 8. At their other ends the side links 15 are connected with each other by a pin 16 having a head 17 that seats within one of the links 15 and a threaded end 19 that is tightly threaded into the other link 15. The head 17 has a preferably square, wrench receiving socket 18 therein which leaves the head 17 flush with the link 15. A sleeve 21 is rotatively supported on the pin 16. Any suitable connecting means by which a pull may be exerted extends around the sleeve 21. I have shown the pin 16 and sleeve 21 as passing through two chain links 20 but obviously they may be connected with a hook or may be connected directly with a wire rope or with any other means.

My wire rope coupling, reversing and re-forming means is productive of special advantages when used in connection with wire rope lines that do not exceed one hundred feet in length. However, it may be used for longer lines.

One use for which this wire rope coupling, reversing and re-forming means is of particular advantage, is for use as an arch line used in tractor logging for connecting with the tractor one or more logs which are being hauled behind the tractor. When logs are thus hauled it is common practice to lift the forward end portions of the logs clear of the ground and permit the rear end portion of the logs to drag on the ground. An arch line is usually a piece of wire rope about sixty feet long with one end portion thereof secured to and wound upon a drum on the tractor and the other end portion connected, usually by a choker line, with the log or logs to be hauled. The end of the arch line that is connected with the logs is liable to have to pass over sheaves and rollers and is ordinarily subjected to sharp bends and much abrasive wear. It is to this end of the line that the hook 6 is secured by my wire rope coupling means. The other end of the arch line is secured to a winding drum on the tractor and the portion of the arch line that is wound on the tractor drum is liable to become drum crushed and flattened to such an extent that it does not wind evenly and smoothly on the drum and for that reason is subject to excessive wear.

It has heretofore been common practice in the use of wire rope arch lines to provide a ferrule on the end portion of the line which is secured to the winding drum and to splice an eye loop or tie a knot in the other end portion of the line which is connected with the hook or like device. The provision of an eye loop or a knot in a wire rope, of one to two inches diameter, consumes from one and one half to three feet of line. Also where an eye loop is spliced in a line or a knot is used therein the line wears rapidly adjacent the fastening and it is desirable to renew this eye loop or knot from three to five times during the life of a line. This means that the line must be shortened from one and one half to three feet each time a new eye loop or knot is provided therein.

To allow for these successive line shortening operations it has been common practice to purchase arc lines approximately fifteen feet longer than actually needed. This previously followed practice has two disadvantages which my invention overcomes. In the first place, for the average arch line, it requires the initial purchase of from fifteen to twenty percent more line than is required in accordance with my invention. In the second place, when an over length line of this type is wound on the tractor drum it results in a side draft on the tractor when the tractor is moving and hauling the logs behind it because it shifts or moves to one side of center the line of take off of the arch line from the tractor drum. This shifting to an off center position of the line of pull on the tractor drum arises from the fact that tractor drums, for any given size of line, are made of a size such that an archline of ordinary length will wind once across the drum and half way back to bring the point of take off of the line to the center of the drum. A longer line will wind more than one and one half laps on the tractor drum and thus take off at a point nearer one end of the drum than the other. The unbalanced pull or side thrust thus produced is manifested when the tractor is moving and hauling a load. It makes the steering of the tractor harder and increases wear and strain on the tractor. In accordance with my invention it is not necessary to use an over length line and the above described difficulties are avoided.

My wire rope coupling reversing and re-forming means provides an efficient pivotal connection of the wire rope with the swivel and reduces bending of the line to a minimum. The rounded bell shaped portions 12 at the ends of the die opening 11 prevent cutting and minimize abrasive wear on the strands of the wire rope at the point where it leaves the yoke. The wire rope is readily pulled through the die opening 11 to reverse said wire rope end for end and equalize or distribute the wear to the best advantage throughout the length of said rope. If said wire rope is badly deformed or drum crushed it will be re-formed and again made substantially round in cross section by pulling it through the die opening 11. The re-forming of a de-formed wire rope makes the rope wind more evenly and smoothly on a winding drum than it will in a deformed condition and, in this way, reduces abrasive wear on the rope and makes it easier to handle.

If the wire rope is kinked the pulling of said rope through the die opening 11 will have a straightening action on the rope. Also pulling the wire rope through the die opening 11, in reversing the rope end to end will tend to straighten out the coil which the rope has acquired from being wound on the drum.

In practice I find that, for wire ropes ranging between one and two inches in diameter, it is satisfactory to have the diameter of the die opening 11 about one eighth of an inch larger than the diameter of the wire rope. This provides rope tolerance so that new wire rope up to almost one eighth of an inch oversize can be installed in the die opening.

The yoke 8 is hardened to resist wear. The wire rope is usually pulled through this yoke 8 by power applied from the tractor drum. For arch lines of the usual length I find there will not be any objectionable heating of the yoke 8.

The greatest wear on the rope will usually take place adjacent the ferrules 14 and very little of the rope need be sacrificed if this worn part of the rope is cut away and the ferrules removed from the cut away portions and replaced on the end portions of the rope. Also it is relatively easy and does not require much labor to re-set these ferrules.

The foregoing description and accompanying drawing clearly disclose a preferred embodiment of my invention but it will be understood that changes may be made within the scope and spirit of the following claims.

I claim:

1. In wire rope coupling, reversing and re-forming means, a clevis; a yoke pivotally mounted in said clevis on an axis transverse to the length of the clevis, said yoke having an opening therein at right angles to the axis on which it is pivoted; a wire rope extending through said opening; and a ferrule fixedly secured to each end portion of said wire rope providing for the end for end reversal of said wire rope in said yoke without removing said wire rope from said yoke to thereby prolong the useful life of said wire rope.

2. In wire rope coupling reversing and re-forming means, a clevis; a yoke pivotally mounted in said clevis on an axis transverse to the length of the clevis, said yoke having a die opening therein extending at right angles to the axis on which the yoke is pivoted; a wire rope of slightly smaller diameter than said die opening movably disposed in said die opening to provide for end for end reversal of said wire rope as respects said yoke and to re-form said rope cross sectionally while it is being reversed end for end; and spaced apart stop members rigid with the respective end portions of said wire rope and positioned on opposite sides of said yoke.

3. In a wire rope coupling reversing and re-forming means, a clevis; a yoke pivotally mounted in said clevis on an axis transverse to the length of the clevis, said yoke having a cylindrical die opening extending therethrough between the two side portions of the clevis and at right angles to the axis on which the yoke is pivoted; a wire rope of slightly smaller diameter than said die opening movable through said die opening to provide for end for end reversal of said wire rope as respects said yoke and to re-form the cross sectional shape of said wire rope; a ferrule fixedly secured to each end portion of said wire rope for engagement with said yoke; and connector means pivotally connected with the end portion of said wire rope remote from said yoke.

4. In a wire rope coupling reversing and re-forming means, a clevis; a hardened steel yoke of substantially rectangular cross section having a transverse die opening therein, said yoke being relieved and beveled at the ends of said die opening to provide rounded surfaces over which a wire rope may be drawn without damage to the rope; two pin members on opposite end portions of said yoke journaled in said clevis; upset portions on the outer ends of said pin members securing said yoke and said clevis together; a wire rope movable through said die opening to provide for end for end reversal of said rope relative to said yoke and to re-form said wire rope cross sectionally while it is being reversed end for end; and a ferrule fixedly secured to each end portion of said wire rope.

JOHN R. SUTTHOFF.